United States Patent
Hong (10) Patent No.: US 7,932,969 B2
(45) Date of Patent: Apr. 26, 2011

(54) LIQUID CRYSTAL DISPLAY DEVICE WITH LIGHT EMITTING DIODE PACKAGE MOUNTED ON PRINTED CIRCUIT BOARD

(75) Inventor: Won-Kee Hong, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 340 days.

(21) Appl. No.: 11/932,108

(22) Filed: Oct. 31, 2007

(65) Prior Publication Data

US 2008/0111950 A1    May 15, 2008

(30) Foreign Application Priority Data

Nov. 15, 2006 (KR) .................. 10-2006-0112569

(51) Int. Cl.
*G02F 1/1335* (2006.01)
*G02F 1/1345* (2006.01)
(52) U.S. Cl. ............ 349/69; 349/65; 349/150; 362/612; 362/631
(58) Field of Classification Search .................... 349/65, 349/69, 150; 362/612, 631
See application file for complete search history.

(56) References Cited

U.S. PATENT DOCUMENTS

| 2005/0068471 A1* | 3/2005 | Aoyagi et al. ................. 349/62 |
| 2005/0068486 A1* | 3/2005 | Ono .............................. 349/150 |
| 2006/0012732 A1* | 1/2006 | Kim .............................. 349/69 |
| 2006/0077693 A1 | 4/2006 | Ko et al. |
| 2006/0268551 A1* | 11/2006 | Mok et al. ..................... 362/294 |
| 2007/0019419 A1* | 1/2007 | Hafuka et al. ................ 362/373 |

FOREIGN PATENT DOCUMENTS

CN        1560672 A      1/2005

* cited by examiner

*Primary Examiner* — Michael H Caley
(74) *Attorney, Agent, or Firm* — Cantor Colburn LLP (57) ABSTRACT

A liquid crystal display device using a light emitting diode includes a liquid crystal panel, a light guide plate including a light inlet part, the light guide plate being arranged at rear side of the liquid crystal panel, a flexible printed circuit film electrically connected to the liquid crystal panel, and a printed circuit board electrically connected to the flexible printed circuit film including a light emitting diode package mounted on a portion close to an end of the printed circuit board contacts the light inlet part of the light guide plate.

15 Claims, 6 Drawing Sheets

LIQUID CRYSTAL DISPLAY DEVICE WITH LIGHT EMITTING DIODE PACKAGE MOUNTED ON PRINTED CIRCUIT BOARD

This application claims priority to Korean Patent Application No. 10-2006-112569, filed Nov. 15, 2006, and all the benefits accruing therefrom under 35 U.S.C. §119, the contents of which in its entirety are herein incorporated by reference.

BACKGROUND OF THE INVENTION (a) Field of the Invention

The present invention relates to a liquid crystal display ("LCD") device and, in particular to an LCD device using a light emitting diode ("LED") as a light source.

(b) Description of the Related Art

An LCD device is a thin flat display device which presents an image by adjusting the light transmissivity of liquid crystal interposed between a thin film transistor substrate and a color filter substrate. The thin film transistor substrate and the color filter substrate have respective electrodes opposing to each other. The light transmissivity of the liquid crystal is controlled by an electric field generated by a voltage applied to the electrodes.

The LCD device includes an LCD panel presenting the image, a driving unit driving the LCD panel, and a backlight unit supplying light to the liquid crystal panel. The backlight unit may be implemented with a cylindrical line light source lamp such as a cold cathode fluorescent lamp ("CCFL") or an external electrode fluorescent lamp ("EEFL"). However, since the cylindrical line light source lamps require a light guide plate and a reflection plate for spreading light, it is difficult to make the LCD device slim and compact.

In order to solve this problem, an LED light source which has a thin thickness and consumes low power has been introduced for use as the backlight unit of the LCD device. In the LCD device using the LED light source, a flexible printed circuit ("FPC") film onto which the LED is mounted is attached to a bottom case of the LCD device by means of double sided adhesive tape.

However, the conventional LED-based LCD device has a drawback in that an adhesion process of the FPC film adds a high degree of difficulty since the FPC film should be evenly attached to the inner surface of the bottom case.

Also, the conventional LED-based LCD device is disadvantageous in that an additional FPC film should be used for electrical connection.

Furthermore, the conventional LED-based LCD device uses a mold frame provided between the LED and the light guide plate to prevent a hot spot from being generated. However, use of the mold frame causes difficulty in securing a sufficient distance between the LED and the light guide plate.

BRIEF SUMMARY OF THE INVENTION

An aspect of the present invention provides an LCD device capable of simplifying an LED installment process by mounting an LED on an edge of a printed circuit board on which a timing controller is mounted and contacting the edge of the PCB to a light inlet part of a light guide plate.

In an exemplary embodiment of the present invention, an LCD device includes a liquid crystal panel, a light guide plate including a light inlet part, the light guide plate being arranged at rear side of the liquid crystal panel, a flexible printed circuit film electrically connected to the liquid crystal panel, and a printed circuit board electrically connected to the flexible printed circuit film including a light emitting diode package mounted on a portion close to an end of the printed circuit board, wherein the end of the printed circuit board contacts the light inlet part of the light guide plate.

In one embodiment, the flexible printed circuit film includes a driving circuit which drives the liquid crystal panel.

In another embodiment, the printed circuit board includes a control integrated circuit which controls the driving circuit.

In another embodiment, the light emitting diode package is arranged with a predetermined distance from the light inlet part.

In another embodiment, the light emitting diode package and the control integrated circuit are mounted on a same surface of the printed circuit board.

In another embodiment, the light emitting diode package and the control integrated circuit are mounted on different surfaces of the printed circuit board.

In another embodiment, the LCD device further includes a heat radiating unit formed on a rear surface of the surface on which the light emitting diode package is mounted to radiate heat generated by the light emitting diode package.

In another embodiment, the printed circuit board includes at least one via hole through which the light emitting diode package and the heat radiating unit are connected to each other.

In another embodiment, the heat radiating unit is made of a material including copper.

In another exemplary embodiment of the present invention, an LCD device includes a liquid crystal panel, a light guide plate including a light inlet part, the light guide plate being arranged at a rear side of the liquid crystal panel, a flexible printed circuit film electrically connected to the liquid crystal panel and having a driving circuit which drives the liquid crystal panel, and a printed circuit board electrically connected to the flexible printed circuit film and having a control integrated circuit mounted thereto and a light emitting diode package mounted on a portion closed to an end of the printed circuit board, wherein the printed circuit board is arranged on the rear side of the liquid crystal panel and the end of the printed circuit board contacts the light inlet part of the light guide plate.

In other embodiment, the light emitting diode package is arranged with a predetermined distance from the light inlet part of the light guide plate.

In another embodiment, the LCD device further includes an optical sheet arranged between the liquid crystal panel and the light guide panel.

In another embodiment, the LCD device further includes a bottom case receiving the light guide plate.

In another embodiment, the light emitting diode package is mounted on a surface of the printed circuit board opposing the liquid crystal panel.

In another embodiment, the LCD device further includes a heat radiating unit formed on a surface opposing the bottom case to radiate heat generated by the light emitting diode package.

In another embodiment, the printed circuit board includes at least one via hole through which the light emitting diode package and the heat radiating unit are connected to each other.

In another embodiment, the heat radiating unit is made of a material including a copper.

In another embodiment, the heat radiating unit is connected to the bottom case to radiate heat generated by the light emitting diode package.

In another embodiment, the LCD device further includes a driver circuit which is mounted on the liquid crystal panel, and is controlled by a control integrated circuit to drive the liquid crystal panel.

In another embodiment, the light emitting diode package and the control integrated circuit are mounted on different surfaces of the printed circuit board.

BRIEF DESCRIPTION OF THE DRAWINGS

The above and other aspects, features and advantages of the present invention will become readily apparent by reference to the following detailed description in conjunction with the accompanying drawings, in which.

DETAILED DESCRIPTION OF THE INVENTION

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in further detail with reference to the accompanying drawings.

Figure 1:
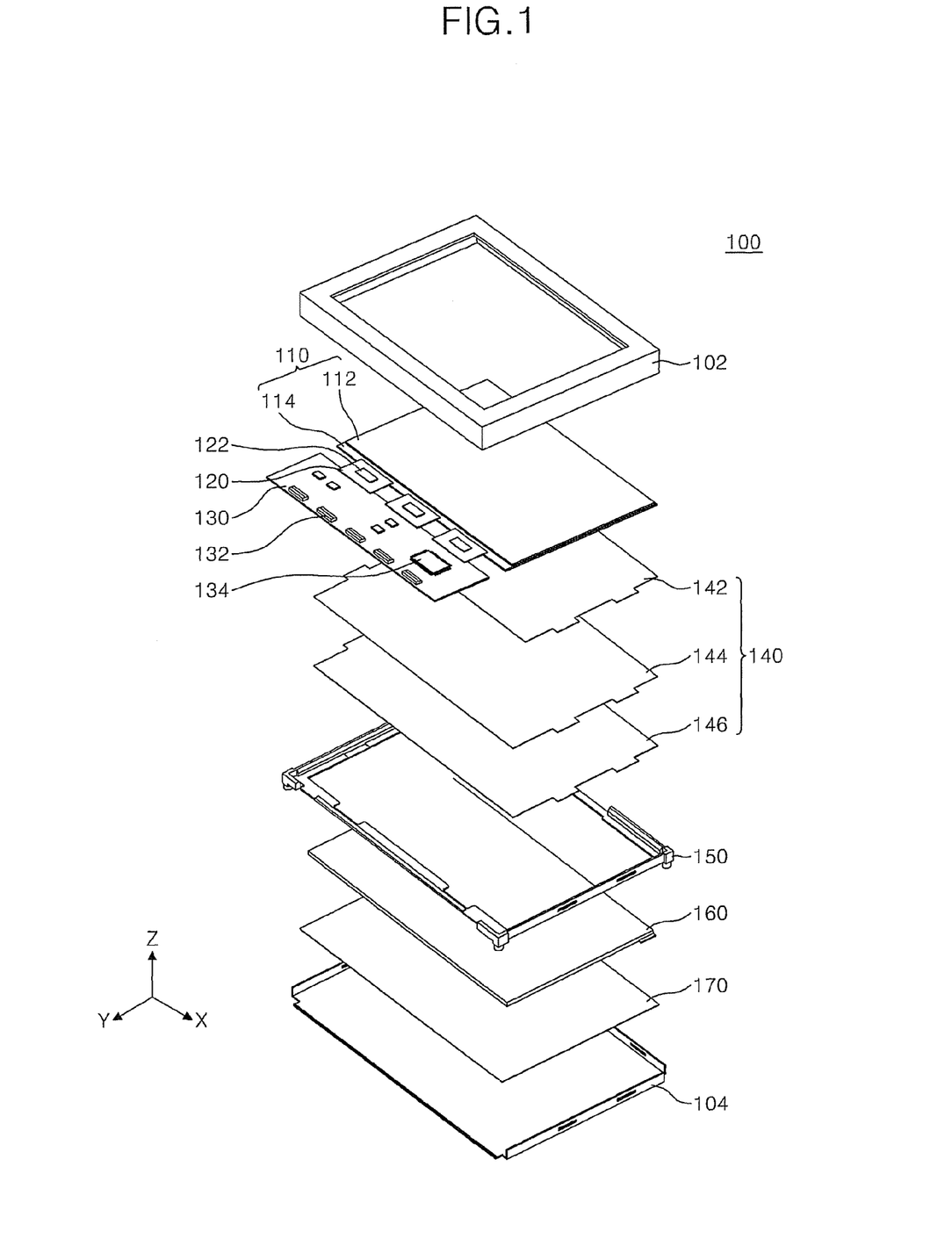
FIG. 1 is an exploded perspective view of an LCD device according to an exemplary embodiment of the present invention.

FIG. 1 is an exploded perspective view of an LCD device according to an exemplary embodiment of the present invention. The LCD 100 includes an LCD panel 110, a flexible printed circuit ("FPC") film 120, a printed circuit board ("PCB") 130, an optical sheet 140, a mold frame 150, a light guide plate 160 and a reflection plate 170, arranged between a top case 102 and a bottom case 104.

The LCD panel 110 includes a color filter substrate 112 and a thin film transistor ("TFT") substrate 114 which face each other and have liquid crystal sealed therebetween. The color filter substrate 112 displays colors by passing light therethrough. The color filter substrate 112 includes a black matrix preventing light leakage, a color filter presenting a color and a common electrode facing a pixel electrode (all not shown, but well known in the art).

The TFT substrate 114 is a substrate on which a TFT array is formed substantially in a matrix form and includes a plurality of gate lines and data lines crossing each other, a plurality of TFTs formed at intersections of the gate and data lines, and the pixel electrode facing the common electrode (all not shown, but well known in the art).

The LCD panel 110 is connected to a gate driver (not shown) which provides gate driving signals for adjusting the light transmissivity of the liquid crystal and to a data driver 122 which applies voltages corresponding to data signals.

The data driver 122, which applies voltages corresponding to the data signals, is mounted on the FPC film 120. The FPC 120 is connected to the LCD panel 110 and the PCB 130 by means of an anisotropic conducting film ("ACF").

In this exemplary embodiment, the data driver 122 is mounted with a tape carrier package ("TCP") method using the FPC film 120. However, the data driver 122 may be mounted using a chip-on-glass ("COG") method on the TFT substrate 114.

The gate driver (not shown) may be mounted using a TCP or COG method. In exemplary embodiments, the gate driver may be formed in a non-display region of the TFT substrate 114 in the form of an amorphous silicon gate when the TFTs are formed.

The PCB 130 includes a timing controller 134 which controls the data driver 122 and the gate driver, and includes a power supply which supplies a voltage to the LCD panel 110. The PCB 130 is electrically connected to the LCD panel 110 through the FPC film 120. The PCB 130 also includes an LED package 132 mounted on an edge of the opposite side of the PCB 130 connected to the LCD panel 110.

The optical sheet 140 is arranged above the light guide plate 160 to uniformly distribute light passing through the light guide plate 160. The optical sheet 140 includes a diffuser sheet 146 which spreads light passing through the light guide plate 160, a prism sheet 144 which improves luminance by refracting and concentrating the light emitted from the diffuser sheet 146, and a protector sheet 142 which protects the prism sheet 144 and widens a viewing angle narrowed by the prism sheet 144.

The mold frame 150 has stepped protrusions on an inner sidewall thereof to support the optical sheet 140, the LCD panel 110, etc. The optical sheet 140 and the LCD panel 110 are arranged on an upper stepped protrusion of the inner sidewall of the mold frame 150. The light guide plate 160 seated on the bottom case 104 is arranged on a lower stepped protrusion of the inner sidewall of the mold frame 150.

The light guide plate 160 converts a linear light source from the LED package 132 mounted on the PCB 110 into a planar or surface light source and emits the planar or surface light source to the LCD panel 102. The reflection plate 170 has high reflectivity. The reflection plate 170 is arranged to contact a bottom surface of the bottom case 104 and reflects light emitted thereon toward the light guide plate 160.

The top case 102 has a rectangular shape which encompasses the mold frame 150 on which the LCD panel 110 is seated. The top case 102 is engaged with the bottom case 104 so as to protect elements including the LCD panel 110 between the top case 102 and the bottom case 104 from being separated.

The bottom case 104 is opened upwardly to provide a seat for the reflection plate 170 and the light guide plate 160. The bottom case 104 protects elements contained therein together with the top case 102. The bottom case 104 also performs a function for radiating heat generated by the LED package 132.

Figure 2:
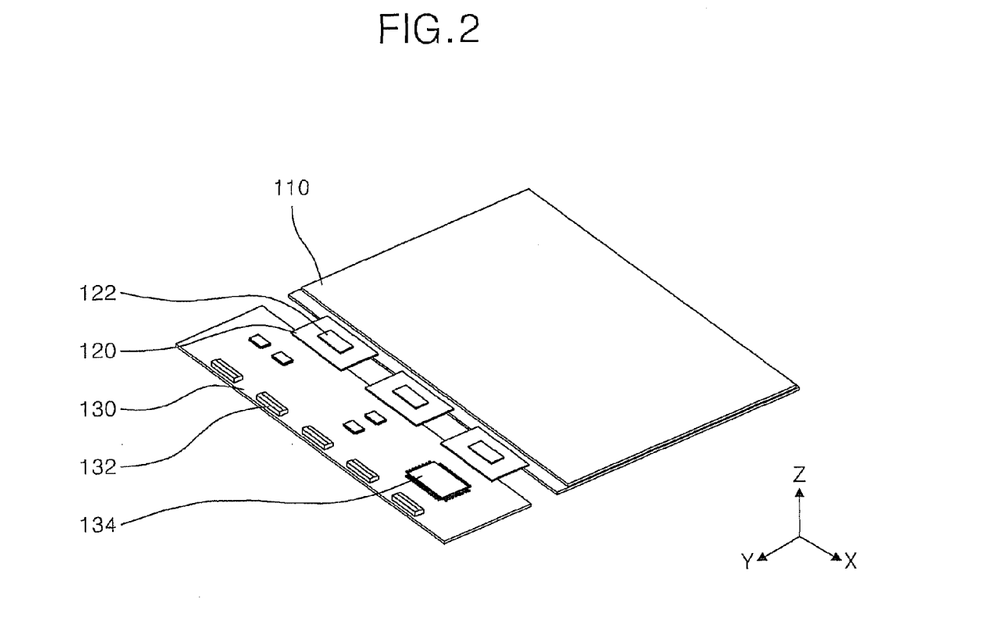
FIG. 2 is a perspective view illustrating a connection relationship between a PCB and an LCD panel of the LCD according to the embodiment of the present invention.

FIG. 2 is a perspective view illustrating a connection relationship between the PCB 130 and the LCD panel 110 of the LCD 100 of FIG. 1 according to the present exemplary embodiment of the present invention.

The PCB 130 is electrically connected to the LCD panel 110 through the FPC film 120 on which the data driver 122 is mounted. In this exemplary embodiment, the LED package 132 is mounted on an edge of an upper surface of the opposite side of the PCB 130 connected to the LCD panel 110. The upper surface means a surface on which integrated circuit ("IC") devices including the timing controller 134 are mounted. That is, the LED package 132 is mounted on the same surface as the surface of the PCB 130 on which the timing controller 134 is mounted.

Figure 3A:
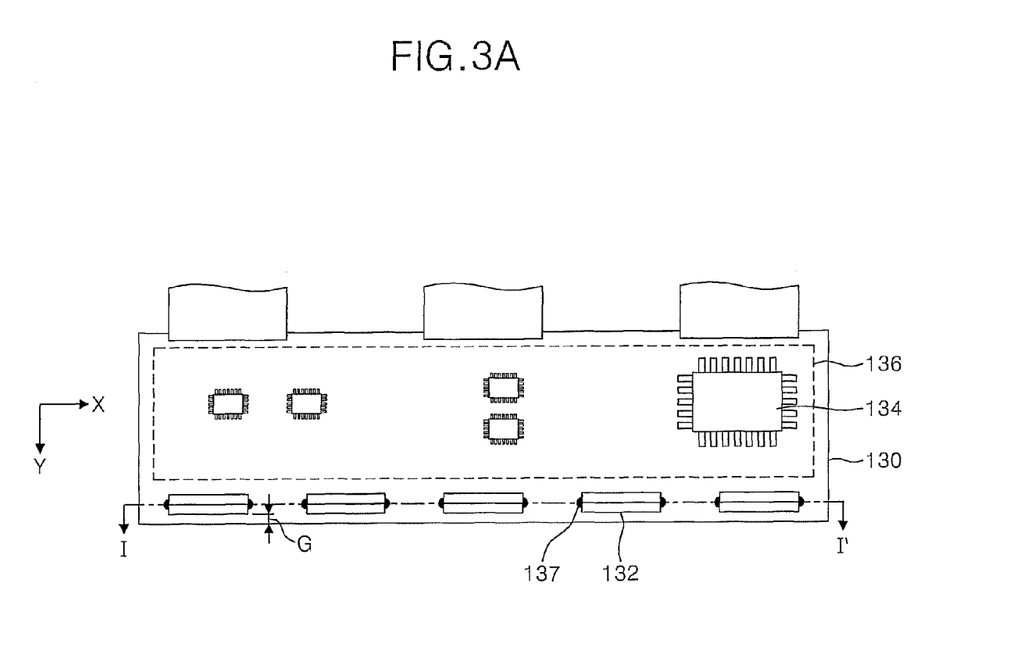
FIG. 3A is a top plan view of the PCB illustrated in FIG. 2.
Figure 3B:
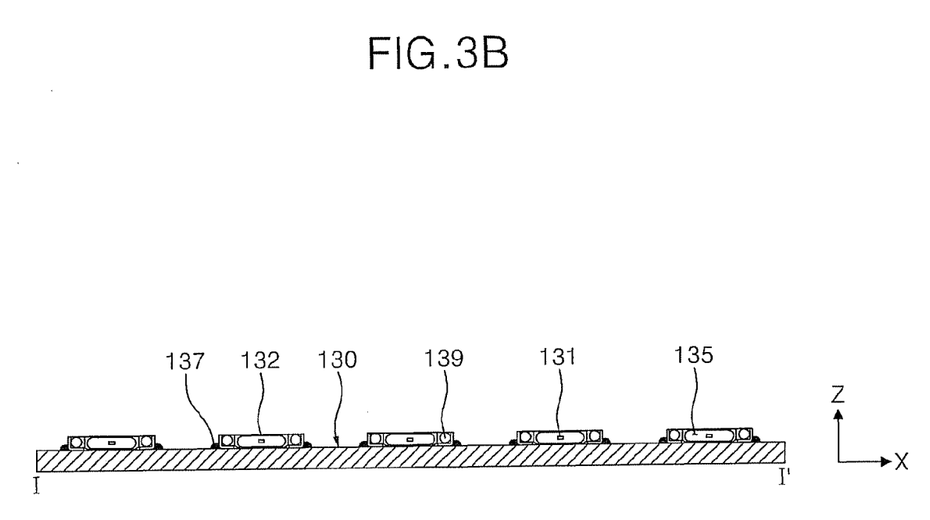
FIG. 3B is cross sectional view taken along line I-I' of the PCB of FIG. 3A.

FIG. 3A is an enlarged top plan view of the PCB 130 in FIG. 2, and FIG. 3B is cross sectional view taken along line I-I' of the PCB 130 of FIG. 3A.

Referring to FIG. 3A, the PCB 130 has a rectangular shape and the LED package 132 is mounted on an edge of the PCB 130 using solder 137. That is, the PCB 130 for mounting the LED package 132 is extended relative to a conventional PCB, and has a linear edge contacting the light guide plate 160 (see FIG. 4). By extending the PCB 130 in this manner, a space 136 for mounting the IC devices such as the timing controller 134 may be secured.

The LED package 132 is arranged to maintain a distance G from a light inlet part of the light guide plate 160 when the edge of the PCB 130 contacts the light guide plate 160. The distance G is configured between the LED package 132 and the light guide plate 160 to prevent a hot spot effect occurrence.

Referring to FIG. 3B, the LED package 132 includes at least one LED 131 mounted in a space 135 secured by a package housing. Both electrodes of the LED 131 are connected to terminals 139 provided by the package housing and the terminals 139 are connected to power supply lines (not shown) formed on the PCB 130.

The LCD device according to the exemplary embodiment of the present invention having the PCB 130 illustrated in FIGS. 2, 3A and 3B does not require an additional FPC film for arranging the LED package 132 near the light inlet part of the light guide plate 160 and a connector for connecting the power supply line (not shown), unlike the conventional LCD device. Accordingly, taping and connecting processes for locating the FPC film near the light inlet part of the light guide plate can be removed, thereby reducing the whole manufacturing cost of the LCD device and simplifying the manufacturing process.

The LCD device employing the PCB 130 illustrated in FIGS. 2, 3A and 3B according to the exemplary embodiment of the present invention has a structure in which the LED package 132 is located near the light inlet part of the light guide plate 160 by using the flexibility of the FPC film 120.

Figure 4:
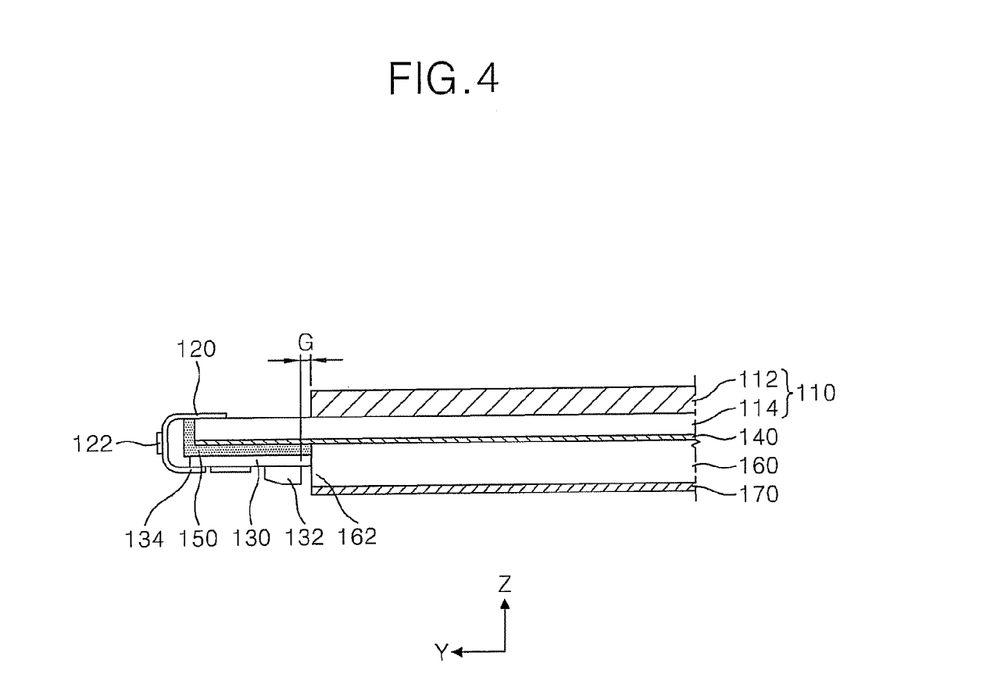
FIG. 4 is a cross sectional view illustrating an arrangement of the PCB and a light guide plate of the LCD device according to the exemplary embodiment of the present invention.

FIG. 4 is a cross sectional view illustrating an arrangement of the PCB 130 and the light guide plate 160 of the LCD device according to the exemplary embodiment of the present invention.

The PCB 130 is arranged on a rear surface of the LCD panel 110 using the flexibility of the FPC film 120. The edge of the PCB 130, along which the LED package 132 is arranged, contacts a light inlet part 162 of the light guide plate 160.

The LED package 132 is spaced apart by a regular distance from the edge of the PCB 130 securing the distance G from the light inlet part 162 of the light guide plate 160, thereby removing a hot spot effect.

Figure 5:
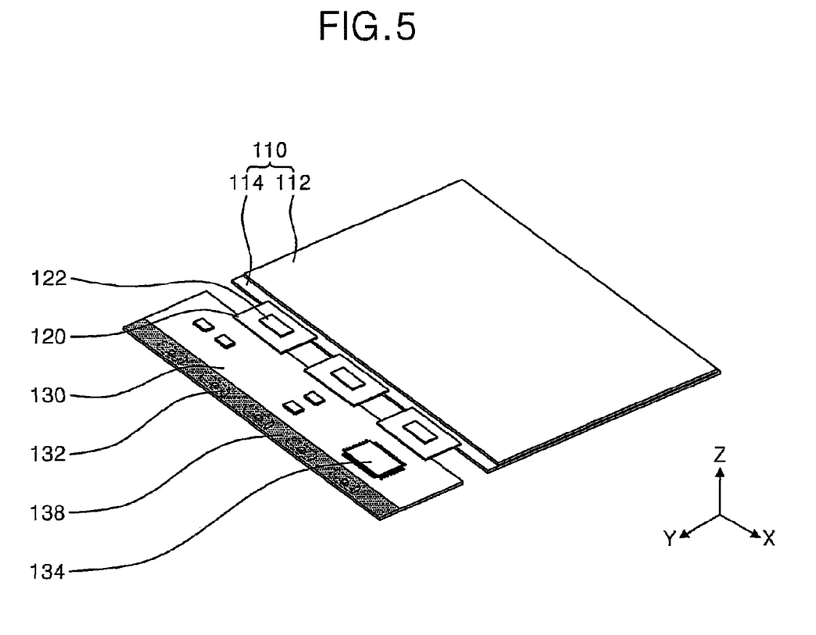
FIG. 5 is a perspective view illustrating a connection relationship between a PCB and an LCD panel of an LCD according to another exemplary embodiment of the present invention.

FIG. 5 is a perspective view illustrating a connection relationship between the PCB 130 and the LCD panel 110 of an LCD according to another exemplary embodiment of the present invention.

The PCB 130 is electrically connected to the LCD panel 110 through the FPC film 120 on which the data driver 122 is mounted.

In this alternative exemplary embodiment, the LED package 132 is mounted on a lower surface of the opposite side of the PCB 130 connected to the LCD panel 110. The lower surface means a surface of the PCB 130 on which IC devices including the timing controller 134 are not mounted. That is, the LED package 132 is mounted on the different surface from the upper surface of the PCB 130 on which IC devices including the timing controller 134 are mounted.

Figure 6A:
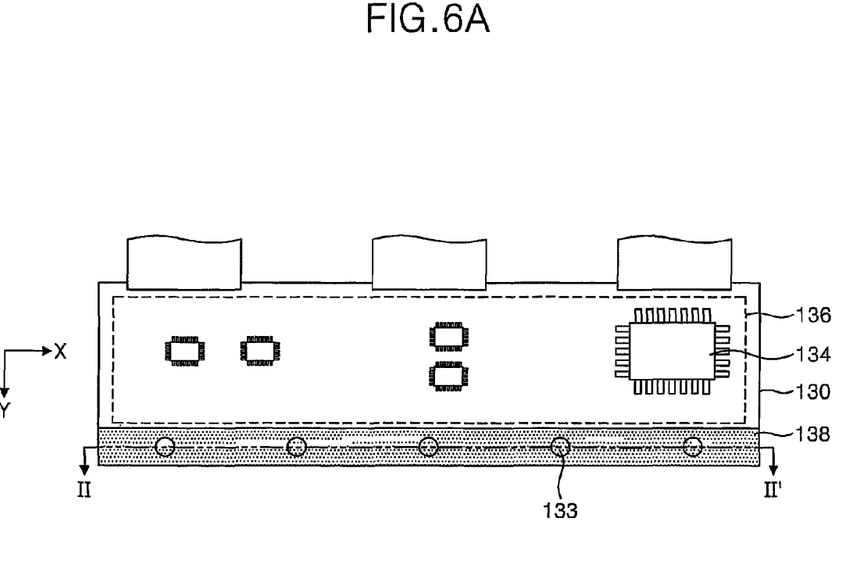
FIG. 6A is a plan view illustrating an upper surface of the PCB of FIG. 5.
Figure 6B:
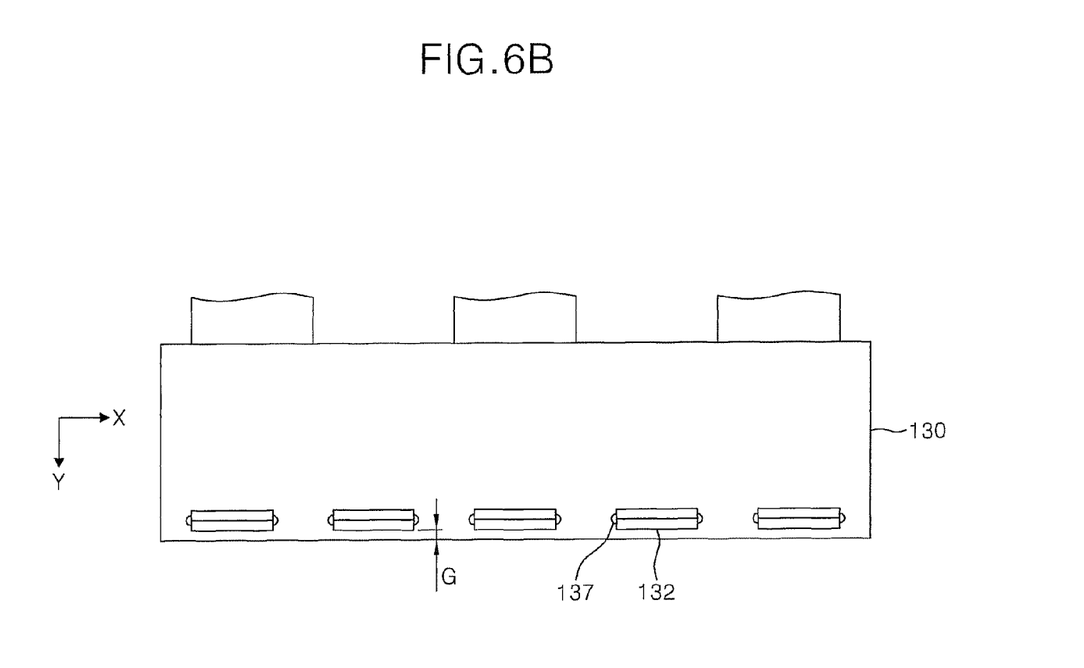
FIG. 6B is a plan view illustrating a lower surface of the PCB of FIG. 5.
Figure 6C:
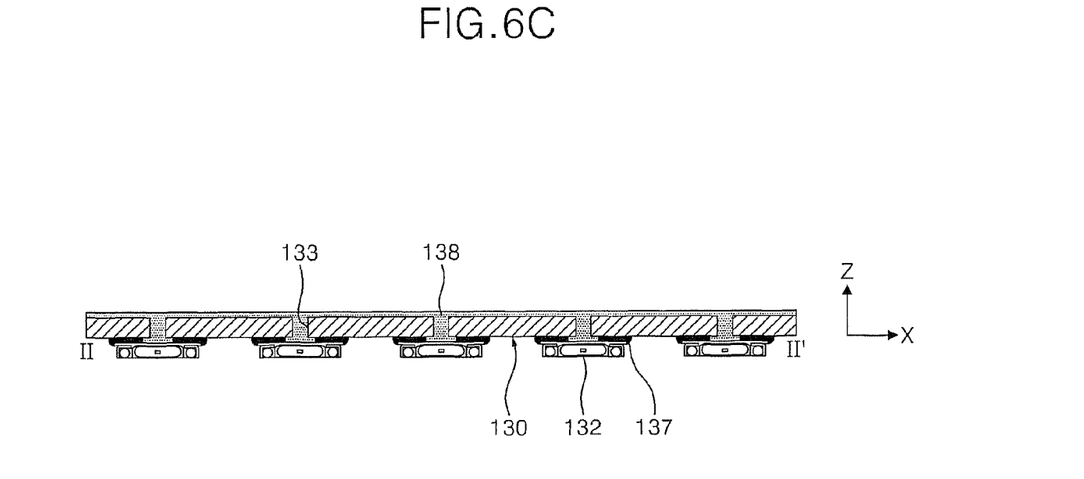
FIG. 6C is a cross sectional view taken along line II-II' of FIG. 6A.

FIG. 6A is a plan view illustrating an upper surface of the PCB 130 of FIG. 5, FIG. 6B is a plan view illustrating a lower surface of the PCB 130 of FIG. 5, and FIG. 6C is a cross sectional view taken along line II-II' of the PCB of FIG. 6A.

Referring to FIG. 6A, the PCB 130 has a rectangular shape and includes a heat radiating unit 138 formed along an edge of the PCB 130. The heat radiating unit 138 may be made of special-use stainless ("SUS") steel, aluminum (Al), or preferably copper (Cu) having high conductivity.

In this alternative exemplary embodiment, an edge of the PCB 130 along which the heat radiating unit 138 is formed is extended, similarly to the PCB 130 of FIG. 3A. Accordingly, the PCB 130 secures the space 136 to mount IC devices including the timing controller 134.

Referring to FIG. 6B, the LED package 132 is mounted by solder 137 on an edge of a rear surface of the PCB 130 corresponding to a region on which the heat radiating unit 138 of the PCB 130 is formed. The LED package 132 is mounted on the edge of the rear surface of the PCB 130 so as to maintain a distance G from the light inlet part 162 of the light guide plate 160 when the edge of the PCB 130 contacts the light guide plate 160. The distance G is configured between the LED package 132 and the light guide plate 160 to prevent occurrence of the hot spot effect.

Referring to FIG. 6C, the LED package 132 is connected to the heat radiating unit 138 through a via hole 133 formed on the PCB 130. The via hole 133 is filled with a conductive material, such as Cu, for example, but is not limited thereto. In exemplary embodiments the conductive material is identical with the material of the heat radiating unit 138. Since a configuration of the LED package 132 and a power supply line (not shown) are identical with that of FIG. 3C, a detailed description is omitted.

The LCD device illustrated in FIGS. 5, 6A, 6B and 6C has a similar structure to that illustrated in FIGS. 2, 3A and 3B, thereby reducing the whole manufacturing cost and simplifying the manufacturing process.

The LCD device employing the PCB 130 illustrated in FIGS. 5, 6A, 6B and 6C has a structure in which the LED packages 132 are located near the light inlet part 162 of the light guide plate 160 by using the flexibility of the FPC film 120 and which efficiently radiate heat generated by the LED packages 132.

Figure 7:
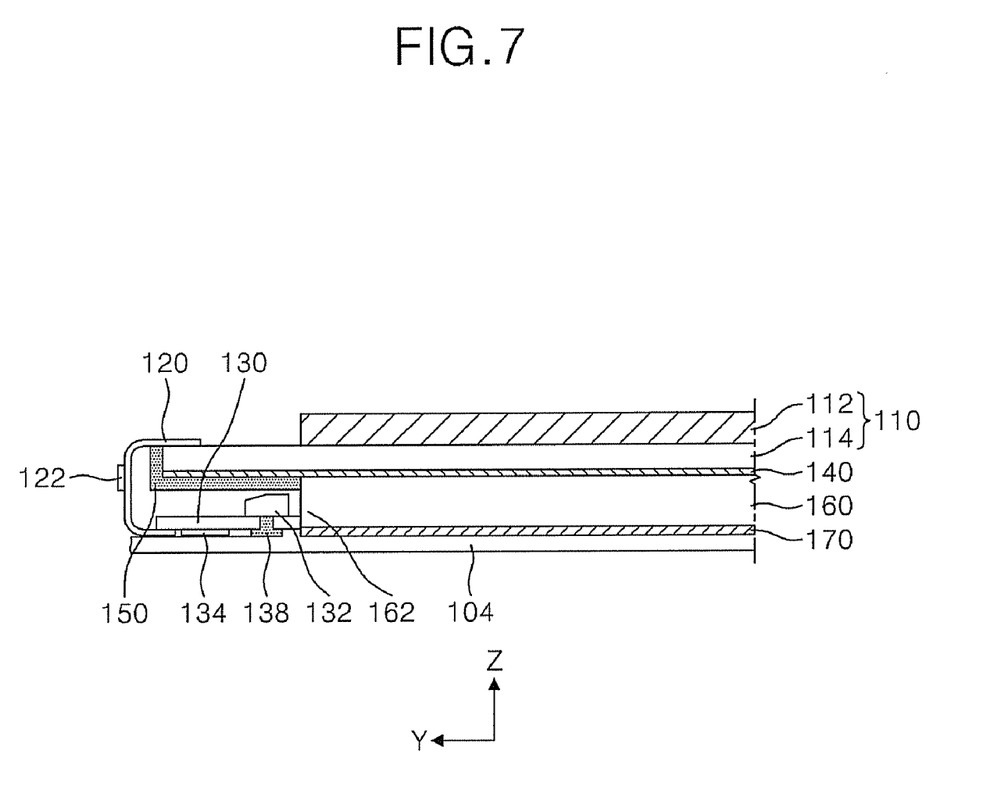
FIG. 7 is a cross sectional view illustrating an arrangement of the PCB and a light guide plate of the LCD device according to another exemplary embodiment of the present invention.

FIG. 7 is a cross sectional view illustrating an arrangement of the PCB 130 and the light guide plate 160 of the LCD device according to another exemplary embodiment of the present invention.

Referring to FIG. 7, the PCB 130 is arranged on a rear surface of the LCD panel 110 using the flexibility of the FPC film 120. An edge of the PCB 130, along which the LED package 132 is arranged, contacts the light inlet part 162 of the light guide plate 160.

In this alternative exemplary embodiment, unlike the LCD of the former exemplary embodiment, the LED package 132 is mounted on the rear surface of the PCB 130 on which the timing controller 134 is not mounted, and the heat radiating unit 138 is formed on the front surface of the PCB 130 on which the timing controller 134 is mounted. Accordingly, the heat radiating unit 138 is formed to contact an inner surface of the bottom case 104, so that it is possible to efficiently radiate heat generated by the LED package 132.

As described above, since the LCD device of the present invention has a structure in which LEDs are arranged along an edge of the PCB so that the edge contacts the light inlet part of the light guide plate, the following advantages are expected.

First, the LCD manufacturing process may be simplified by removing the very difficult adhesion process of the FPC film on which the LED is mounted, thereby reducing number of defective LCDs.

Second, the LCD device does not require an additional FPC film for mounting the LEDs and a connector for connecting the power supply line to the LEDs, thereby reducing the manufacturing cost.

Third, the PCB is extended to the light inlet part of the light guide plate such that it is possible to secure a sufficient space for arranging other devices on the PCB.

Finally, the LCD device of the present invention secures a distance between the LEDs and the light guide plate by adjusting the mounting position of the LEDs out of the edge of the PCB, thereby preventing the generation of the hot spot effect.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display device comprising:
a liquid crystal panel;
a light guide plate including a light inlet part, the light guide plate being arranged at a rear side of the liquid crystal panel;
a bottom case receiving the light guide plate;
a flexible printed circuit film electrically connected to the liquid crystal panel;
a printed circuit board having a first surface and a second surface facing the first surface, the printed circuit board electrically connected to the flexible printed circuit film and including a light emitting diode package mounted on the first surface, and the light emitting diode package being proximate to an end of the printed circuit board; and
a heat radiating unit disposed on the second surface to radiate a heat generated by the light emitting diode package,
wherein the end of the printed circuit board faces the light inlet part, the printed circuit board includes at least one via hole through which the light emitting diode package and the heat radiating unit make contact with each other, and the heat radiating unit is connected to the bottom case to radiate the heat.

2. The liquid crystal display device of claim 1, wherein the flexible printed circuit film includes a driving circuit which drives the liquid crystal panel.

3. The liquid crystal display device of claim 2, wherein the printed circuit board includes a control integrated circuit which controls the driving circuit.

4. The liquid crystal display device of claim 3, wherein the light emitting diode package is arranged with a predetermined distance from the light inlet part, and the end of the printed circuit board makes contact with the light inlet part.

5. The liquid crystal display device of claim 4, wherein the control integrated circuit is mounted on the first surface.

6. The liquid crystal display device of claim 4, wherein the control integrated circuit is mounted on the second surface.

7. The liquid crystal display device of claim 1, wherein the heat radiating unit is made of a material including copper.

8. A liquid crystal display device comprising:
a liquid crystal panel;

a light guide plate including a light inlet part, the light guide plate being arranged at a rear side of the liquid crystal panel;

a bottom case receiving the light guide plate;

a flexible printed circuit film electrically connected to the liquid crystal panel;

a printed circuit board having a first surface and a second surface facing the first surface, the printed circuit board electrically connected to the flexible printed circuit film and having a control integrated circuit mounted thereto and a light emitting diode package mounted on the first surface, and the light emitting diode package being proximate to an end of the printed circuit board; and a heat radiating unit disposed on the second surface to radiate a heat generated by the light emitting diode package, wherein the printed circuit board is adjacent to the rear side, the end of the printed circuit board faces the light inlet part, the printed circuit board includes at least one via hole through which the light emitting diode package and the heat radiating unit make contact with each other, and the heat radiating unit is connected to the bottom case to radiate the heat.

9. The liquid crystal display device of claim 8, wherein the light emitting diode package is arranged with a predetermined distance from the light inlet part of the light guide plate, the end of the printed circuit board makes contact with the light inlet part.

10. The liquid crystal display device of claim 9, further comprising an optical sheet arranged between the liquid crystal panel and the light guide panel.

11. The liquid crystal display device of claim 9, wherein the light emitting diode package is interposed between the printed circuit board and the liquid crystal panel in a sectional view.

12. The liquid crystal display device of claim 11, wherein the heat radiating unit is interposed between the light emitting diode and the bottom case in a sectional view to radiate the heat.

13. The liquid crystal display device of claim 9, wherein the heat radiating unit is made of a material including copper.

14. The liquid crystal display device of claim 8, further comprising a driver circuit which is mounted on the liquid crystal panel, and the driver circuit is controlled by the control integrated circuit to drive the liquid crystal panel.

15. The liquid crystal display device of claim 14, wherein the control integrated circuit is mounted on the second surface.

* * * * *